(12) United States Patent
Puryk et al.

(10) Patent No.: US 7,788,891 B2
(45) Date of Patent: Sep. 7, 2010

(54) ENDLESS BELT MOUNTING CONFIGURATION FOR AN AGRICULTURAL HARVESTER

(75) Inventors: Corwin M. Puryk, East Moline, IL (US); Bruce A. Coers, North Hillsdale, IL (US); Benjamin M. Lovett, Colona, IL (US)

(73) Assignee: Deere & Company, Moline, IL (US)

( * ) Notice: Subject to any disclaimer, the term of this patent is extended or adjusted under 35 U.S.C. 154(b) by 161 days.

(21) Appl. No.: 12/163,293

(22) Filed: Jun. 27, 2008

(65) Prior Publication Data

US 2009/0320431 A1    Dec. 31, 2009

(51) Int. Cl.
*A01D 34/00* (2006.01)
(52) U.S. Cl. .............................. 56/181; 56/14.3; 56/153
(58) Field of Classification Search .................. 56/14.4, 56/14.5, 153, 181, 312, 208, 257, 14.3
See application file for complete search history.

(56) References Cited

U.S. PATENT DOCUMENTS 2,438,065 A * 3/1948 Love .......................... 56/303
7,467,506 B2 * 12/2008 Lovett et al. ................. 56/15.8
2007/0193243 A1 8/2007 Schmidt et al.

* cited by examiner

*Primary Examiner*—Robert E Pezzuto
(74) *Attorney, Agent, or Firm*—Taylor IP, P.C.

(57) ABSTRACT

A cutting platform for use with an agricultural harvester includes at least one platform section. Each platform section includes a frame, a cutterbar assembly defining a leading edge of the platform section, an endless belt, and a plurality of float arms pivotally attached to the frame. The cutterbar assembly is movable in a localized manner in upwards and downwards directions. At least one float arm carries a roller which supports the endless belt and is positioned within a loop of the endless belt. Each roller is pivotable or removable relative to the corresponding float arm.

30 Claims, 11 Drawing Sheets

ENDLESS BELT MOUNTING CONFIGURATION FOR AN AGRICULTURAL HARVESTER

FIELD OF THE INVENTION

The present invention relates to agricultural harvesters, and, more particularly, to agricultural combines including a draper cutting platform.

BACKGROUND OF THE INVENTION

An agricultural harvester such as a combine includes a head and a feeder housing which remove the crop material from the field, gather the crop material and transport the crop material to a separator. In the case of thinner stemmed crops such as soybeans, wheat, etc. which may be cut with a sickle bar carrying a plurality of knives, the head may also be known as a cutting platform. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

A cutting platform may generally be of two types. One type typically has a sheet metal floor with a dual feed auger near the rear of the cutting platform for feeding the crop material longitudinally to the feeder housing. A cutting platform of this type with auger feed is more common.

Another type of cutting platform, also known as a draper platform, utilizes a flat, wide belt, referred to as a draper or draper belt to convey crop material. The arrangement and number of belts vary among platforms. One style of draper platform has two side belts that convey crop material longitudinally, to the center of the platform, where a center feed belt moves the crop material laterally into the feeder housing. Each belt is wrapped around a pair of rollers, one being a drive roller and the other being an idler roller. An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

With a draper platform as described above, it is typically necessary to use an endless belt in the form of a flat belt with two opposite ends which are fastened together using an external mechanical device and appropriate fasteners. This requires that the bottom run of the endless loop formed by the belt be threaded through the framework and carrier elements, pulled taught, and then fastened together. This process can be difficult and time consuming.

What is needed in the art is a draper platform which allows the belts on the one or more platform sections to be installed faster and easier.

SUMMARY OF THE INVENTION

The invention in one form is directed to a cutting platform for use with an agricultural harvester, including at least one platform section. Each platform section includes a frame, a cutterbar assembly defining a leading edge of the platform section, an endless belt, and a plurality of float arms pivotally attached to the frame. The cutterbar assembly is movable in a localized manner in upwards and downwards directions. At least one float arm carries a roller which supports the endless belt and is positioned within a loop of the endless belt. Each roller is pivotable or removable relative to the corresponding float arm.

The invention in another form is directed to a method of mounting a belt on a draper platform in an agricultural harvester, including the steps of: removing at least a portion of a cutterbar assembly at a leading edge of a platform section; disengaging a front end of at least one roller from the cutterbar assembly; mounting an endless belt on the platform section such that the at least one roller is positioned within a loop of the endless belt; and reattaching the front end of the at least one roller to the cutterbar assembly.

DETAILED DESCRIPTION OF THE INVENTION

Figure 1:
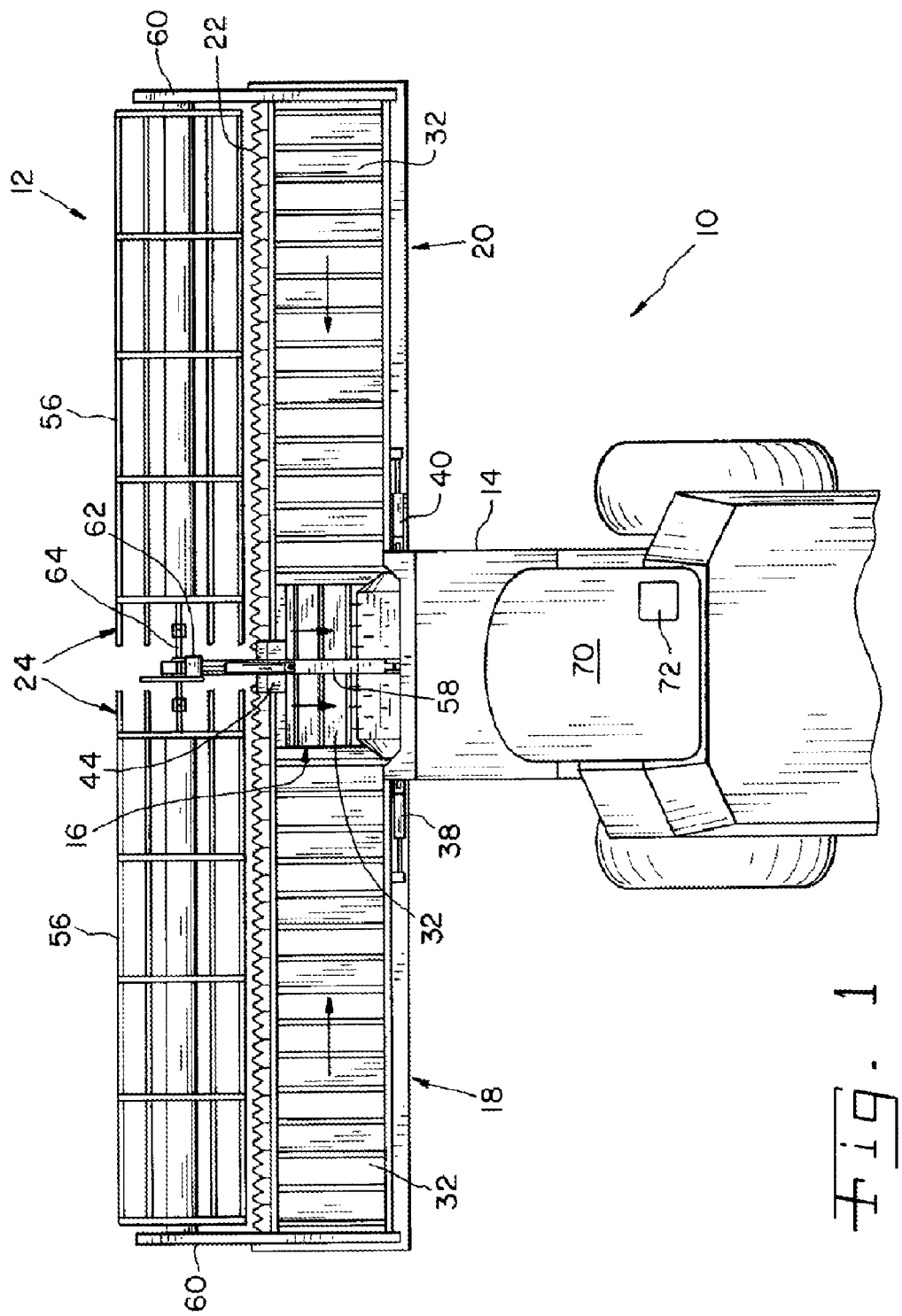
FIG. 1 is a fragmentary, top view of an agricultural combine including an embodiment of a draper platform of the present invention.
Figure 2:
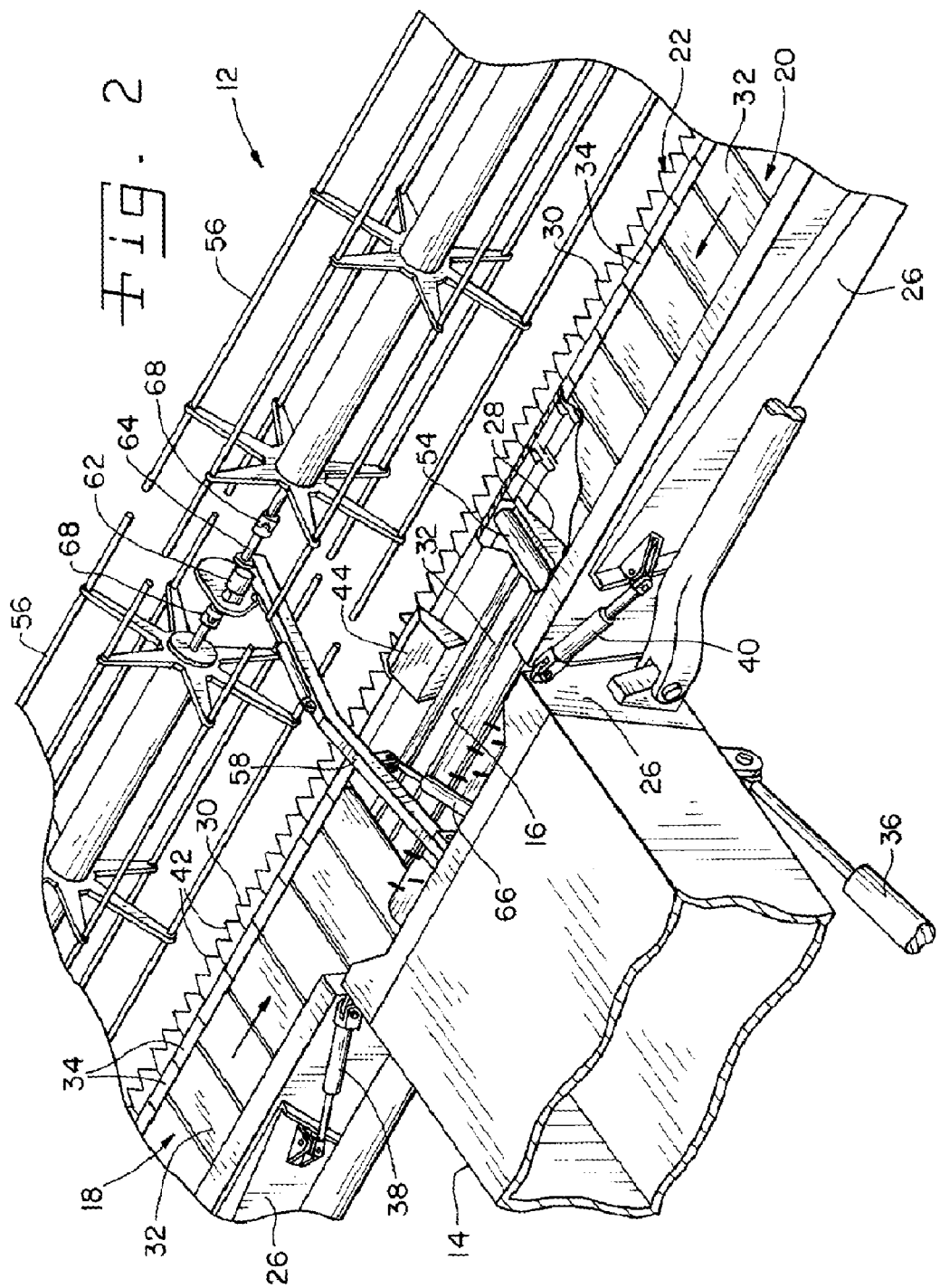
FIG. 2 is a fragmentary, perspective view of the agricultural combine of FIG. 1.

Referring now to the drawings, and, more particularly to FIGS. 1 and 2, there is shown an agricultural harvester in the form of a combine 10 including an embodiment of a cutting platform 12 of the present invention. Combine 10 includes a feeder housing 14 which is detachably coupled with cutting platform 12. Feeder housing 14 receives the crop material from cutting platform 12, both grain and non-grain crop material, and transports the crop material to a separator within combine 10 in known manner (not shown). The grain crop material is separated from the non-grain crop material, cleaned and transported to a grain tank. The non-grain crop material is transported to a chopper, blower, etc. in known manner and distributed back to the field.

Cutting platform 12 generally includes a plurality of platform sections 16, 18 and 20, a cutterbar assembly 22 and a reel assembly 24. In the embodiment shown, platform section 16 is a center platform section, platform section 18 is a first wing platform section, and platform section 20 is a second wing platform section. Although shown with three platform sections, cutting platform 12 may be configured with more or less platform sections, depending upon the particular application.

Each platform section 16, 18 and 20 generally includes a frame 26, a plurality of float arms 28 coupled with a respective frame 26, a cutterbar assembly 22 carried by the outboard ends of respective float arms 28, and at least one endless belt 32. The frame 26 of first wing platform section 18 and second wing platform section 20 are each pivotally coupled with center platform section 16, such that the outboard ends of first wing platform section 18 and second wing platform section 20 can move up and down independent from center platform section 16. To that end, a lift cylinder 36 coupled between the frame of combine 10 and feeder housing 14 lifts the entire cutting platform 12, a first tilt cylinder 38 coupled between the respective frame 26 of first wing platform section 18 and center platform section 16 pivotally moves first wing platform section 18 relative to center platform section 16, and a second tilt cylinder 40 coupled between the respective frame 26 of second wing platform section 20 and center platform section 16 pivotally moves second wing platform section 20 relative to center platform section 16.

Reel assembly 24 includes two reels 56, center reel support arm 58 and a pair of outer reel support arms 60. Outer reel support arms 60 are pivotally coupled at one end thereof with an outboard end of a respective first wing platform section 18 or second wing platform section 20. Outer reel support arms 60 rotationally carry a respective reel 56 at an opposite end thereof. Each outer reel support arm 60 may be selectively moved up and down using a hydraulic cylinder, and the pair of hydraulic cylinders are typically coupled in parallel so that they move together upon actuation.

Center reel support arm 58 is pivotally coupled at one end thereof with center platform section 16 above the opening leading to feeder housing 14. Center reel support arm 58 rotationally carries an inboard end of each reel 56 at an opposite end thereof. A hydraulic motor 62 or other suitable mechanical drive rotationally drives each reel 56. More particularly, hydraulic motor 62 drives a common drive shaft 64 through a chain and sprocket or other suitable arrangement (not shown). The rotational speed of reels 56 can be adjusted by an operator by adjusting the rotational speed of hydraulic motor 62.

Center reel support arm 58 may be selectively moved up and down using a hydraulic cylinder 66. Center reel support arm 58 is movable independently from outer reel support arms 60. To accommodate this independent movement, drive shaft 64 driven by hydraulic motor 62 is coupled at each end thereof via a universal joint 68 with a respective reel 56. This independent movement of center reel support arm 58 can be accomplished manually using a separate actuating switch or lever in operator's cab 70, or automatically using an electronic controller 72 located within cab 70 or other suitable location.

Figure 3:
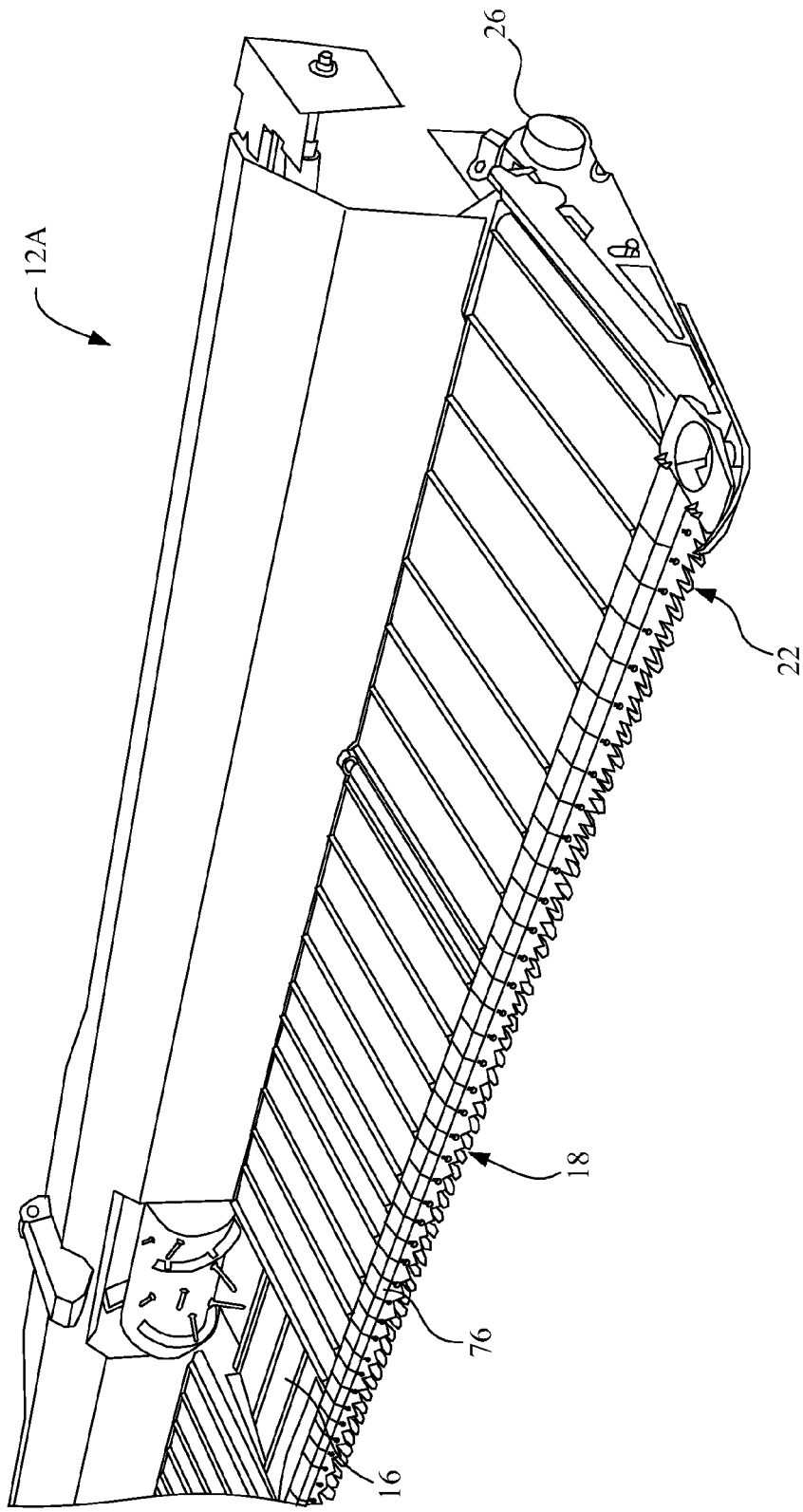
FIG. 3 is a fragmentary, perspective view of the cutting platform shown in FIGS. 1 and 2.
Figure 4:
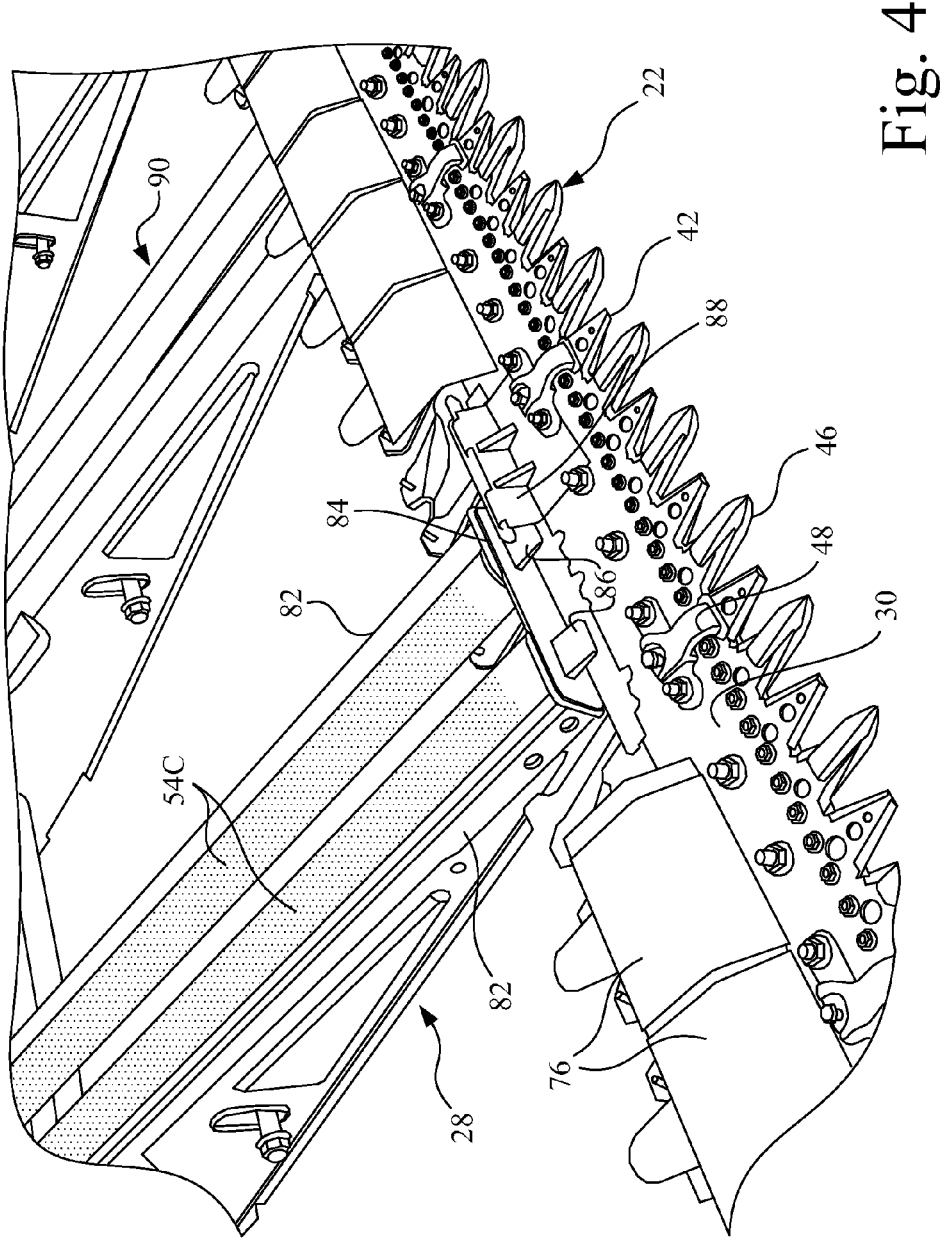
FIG. 4 is a fragmentary, perspective view of the cutting platform shown in FIG. 3.

Referring to FIGS. 3 and 4, another embodiment of a cutting platform 12A will be described in greater detail. Cutterbar assembly 22 includes two cutterbars 30 carried at the outboard ends of float arms 28 (i.e., at the leading edge of a platform section 16, 18 or 20). Each cutterbar 30 includes a plurality of knives 42 carried by a bar (not specifically shown). The particular type of knife can vary, such as a double blade knife (as shown) or a single blade knife. The bar is formed from a metal which is flexible to an extent allowing a desired degree of flexure across the width of cutting platform 12. In the embodiment shown, a majority of each cutterbar 30 is carried by a respective first wing platform section 18 or second wing platform section 20, with a lesser extent at the adjacent inboard ends of each cutterbar 30 being carried by center platform section 16. Cutterbars 30 are driven from opposite outboard ends of cutting platform 12A, or may be simultaneously driven by a single knife drive 44 (FIG. 2) providing reciprocating movement in concurrent opposite directions between cutterbars 30.

A plurality of knife guards 46 are positioned in opposition to knives 42 for providing opposing surfaces for cutting the crop material with knives 42. A plurality of keepers 48 spaced along cutterbars 30 have a distal end above cutterbars 30 for maintaining cutterbars 30 in place during reciprocating movement.

Crop ramps 76 are overlapped but not rigidly attached to each other, thereby allowing flexure during a harvesting operation. Each crop ramp 76 forms an upper ledge positioned above endless belt 32 which assists in maintaining the crop material on endless belt 32 as it is transported toward feeder housing 14. In the embodiment shown in FIG. 5, crop ramp 76 has a flat, angled orientation to assist in transport of the crop material from cutterbar assembly 22 to endless belt 32. For certain applications, it may be possible to use crop ramps with a flat, vertical orientation, or eliminate crop ramps 76.

First wing platform section 18 and second wing platform section 20 each include an inner endless belt 32A and an outer endless belt 32B. Endless belts 32A and 32B have a plurality of spaced apart cleats 90 which do not extend to the lateral side edges thereof, and assist in movement of the crop material toward feeder housing 14. The term "endless belt", as used herein, is broadly intended to mean a belt that forms a continuous loop to run over rollers, supports, etc. Such a belt may have ends which are bonded, fused, riveted, fastened with an intervening mechanical splice, etc.

Each float arm 28 has a distal end adjacent the leading edge of cutting platform 12. The float arms 28 associated with each respective platform section 16, 18 and 20 are mounted with a corresponding flexible substrate (not shown) extending substantially across the width of that particular platform section 16, 18 or 20. The flexible substrate for each particular platform section 16, 18 and 20 in essence forms the backbone of cutterbar assembly 22 to which the other modular components are mounted and allows flexibility of the platform section across the width thereof. In the embodiment shown, the flexible substrate is a steel plate with various mounting holes formed therein, and has a modulus of elasticity providing a desired degree of flexibility. The geometric configuration and material type from which the substrate is formed may vary, depending upon the application.

Float arms 28 may be pivoted at their connection locations with a respective frame 26. A float cylinder (not shown) coupled between a respective frame 26 and float arm 28 may be used for raising or lowering the outboard end of float arm(s) 28 at the leading edge of cutting platform 12. Each float cylinder may also be placed in a "float" position allowing the connected float arm 28 to generally follow the ground contour during operation.

Figure 11:
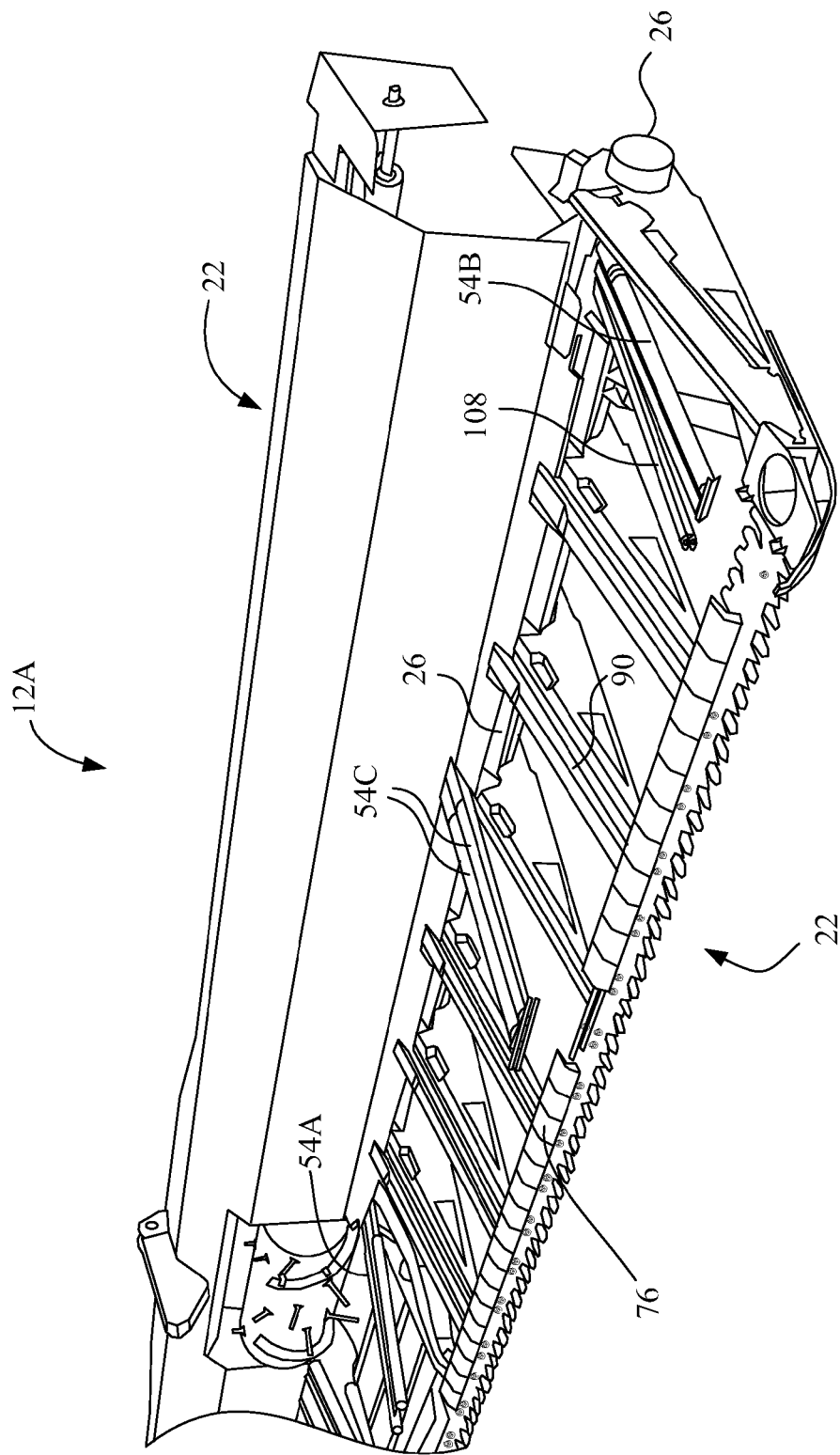
FIG. 11 is a fragmentary, perspective view of the cutting platform shown in FIGS. 3 and 4, with the rollers pivoted to an upward position and the static supports installed.
Figure 12:
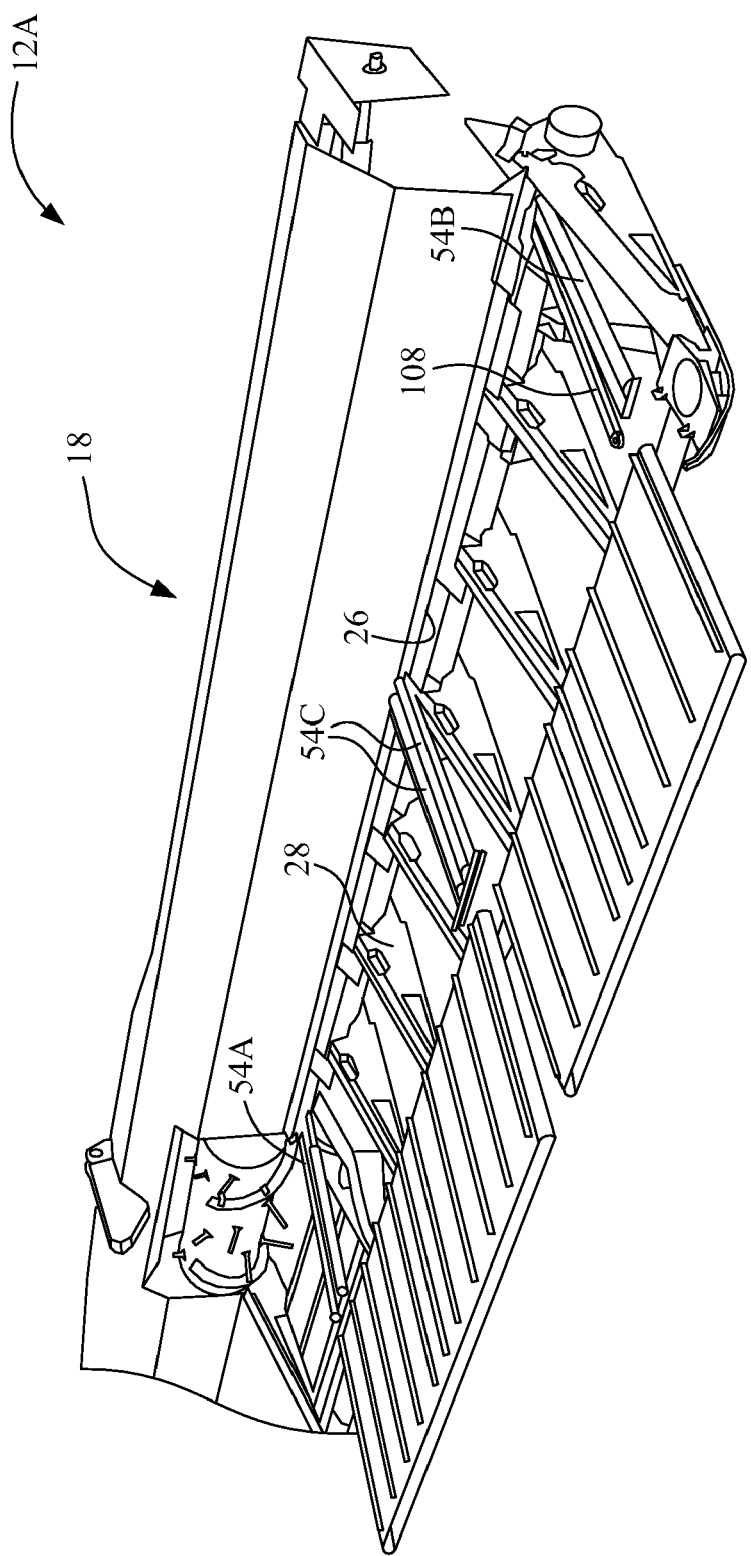
FIG. 12 is a fragmentary, perspective view of the cutting platform shown in FIG. 11, with the rollers pivoted to an upward position, the static supports removed, and a pair of belts ready to install.

A number of float arms 28 carry a plurality of respective rollers 54 which carry and are positioned within a loop of a respective endless belt 32. At the inboard end of first wing platform section 18 and second wing platform section 20 is an inner idler roller 54A, and at the outboard end of first wing platform section 18 and second wing platform section 20 is an outer idler roller 54B (FIGS. 11 and 12). A float arm 28 positioned approximately midway between the inner idler roller 54A and outer idler roller 54B carries a pair of drive rollers 54C which are driven by a common drive 80 at a rear end thereof (FIGS. 5, 6, 11 and 12).

Rollers 54A, 54B and/or 54C are pivotable or removable relative to a respective float arm 28, such that an endless belt can be easily mounted thereon without substantial disassembly of cutterbar assembly 22, and without having to feed an end of an endless belt through a lower run, refasten together, etc. In the embodiment shown, rollers 54A, 54B and 54C are each pivotable at a rear end thereof such that a front end of each respective roller can be positioned above cutterbar assembly 22. This allows a corresponding endless belt 32 to be slid over the rollers 54A, 54B and 54C, with the lower run of the belt between a respective roller and cutterbar assembly 22.

More particularly, each roller 54A, 54B and 54C is mounted to and supported by a sub-frame 82 at a front end and a rear end thereof. Each roller 54A, 54B and 54C and corresponding sub-frame 82 together pivot at a rear end of the roller relative to a corresponding float arm 28 such that a front end of each roller 54A, 54B and 54C is positioned above cutterbar assembly 22. Each sub-frame 82 rotatably carries a corresponding roller 54A, 54B and 54C at the front end of the roller, such as with an appropriate bearing or bushing. Sub-frames 82 are positioned within the loop of a corresponding endless belt 32A or 32B so as not to interfere with operation of the endless belt during operation.

Figure 5:
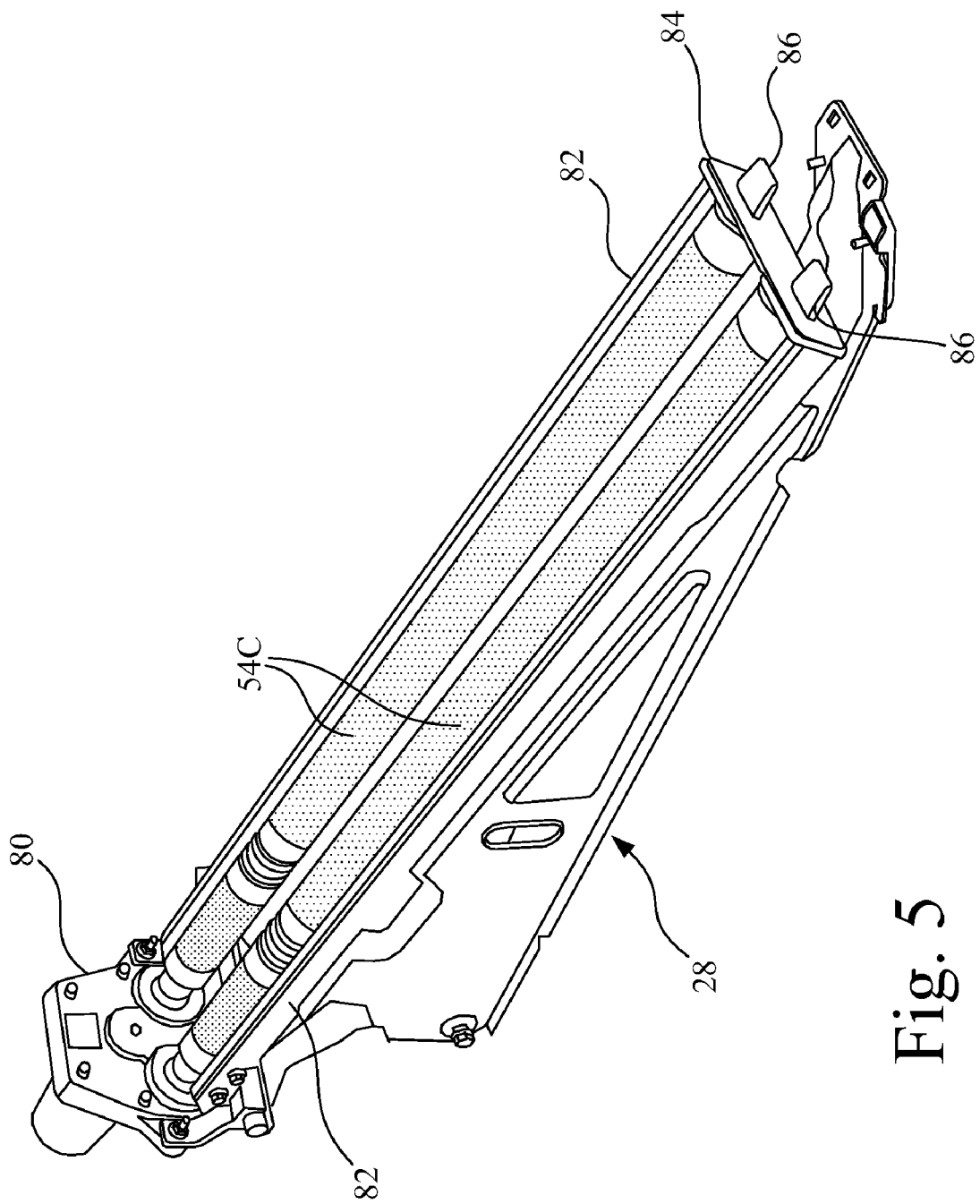
FIG. 5 is a perspective view of the float arm and drive roller assembly shown in FIG. 4.
Figure 6:
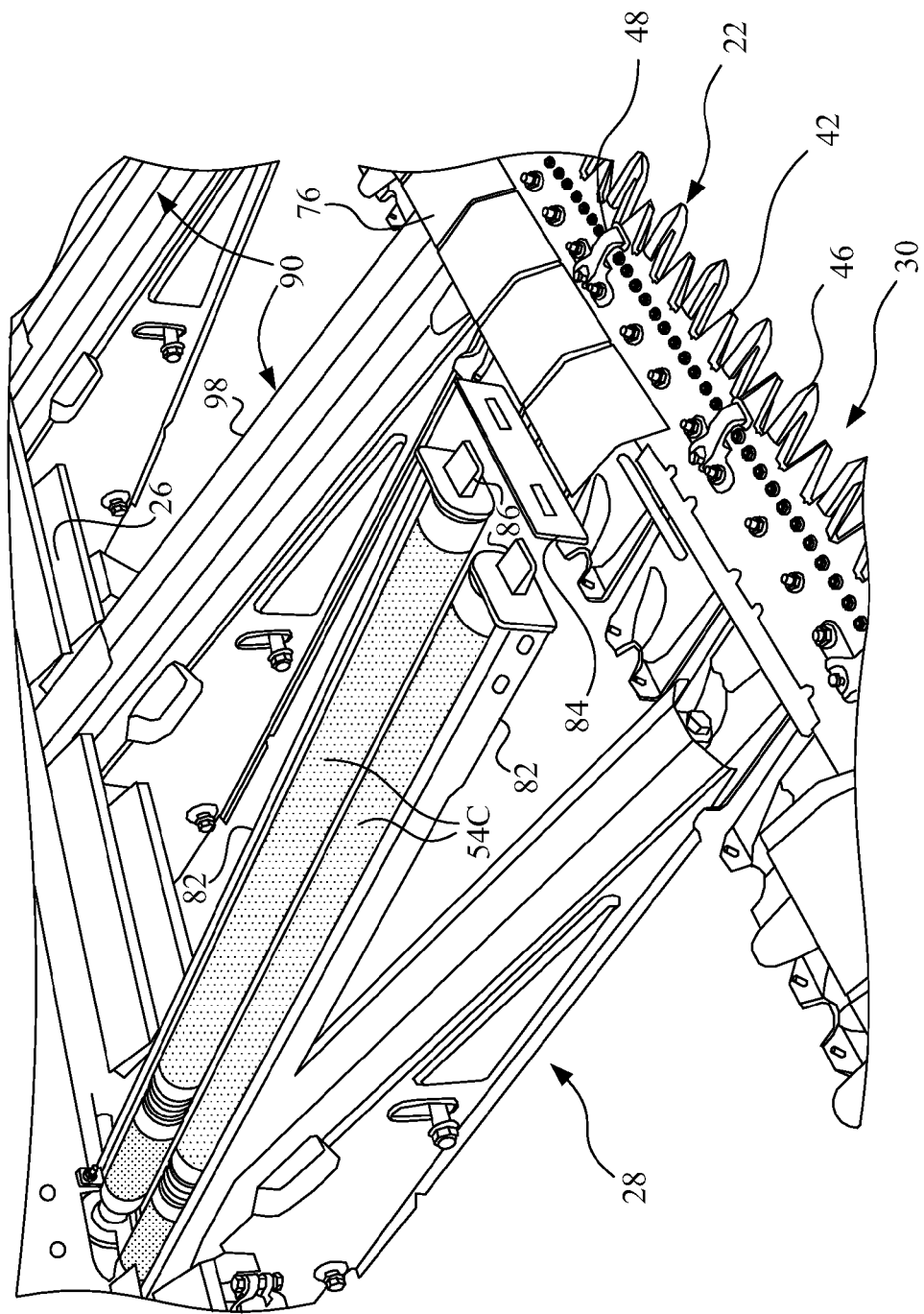
FIG. 6 is a perspective view showing the drive roller assembly pivoted to an upward position relative to the cutterbar assembly.

An alignment plate 84 interconnects the pair of drive rollers 54C at a front edge thereof, on the outside of the sub-frame 82 (FIGS. 5 and 6). A flat projection 86 associated with each drive roller 54C mates with a corresponding slot formed in alignment plate 84. Alignment plate 84 lies against the top, rear edge of the flexible substrate forming part of cutterbar assembly 22, and is held in place against the flexible substrate by a number of laterally adjacent brackets 88 behind crop ramps 76 (FIG. 4).

At least one float arm 28 carries a static support 90 for supporting a respective endless belt 32 (FIGS. 6, 8, 9 and 11). Each static support 90 is positioned within a loop of endless belt 32A or 32B, and is likewise pivotable or removable relative to a corresponding float arm 28. This allows endless belt 32A or 32B to be easily mounted without substantial disassembly of cutterbar assembly 22. In the embodiment shown, each static support 90 is removably fastened to a corresponding float arm 28 at a rear edge thereof, and keyed to cutterbar assembly 22 at a front edge thereof. In particular, each static support 90 is fastened using a bolt 92 at the rear end thereof, and has a pair of holes 94 formed in the front end which receive angled pins 96 extending upwardly from cutterbar assembly 22. Upon removal of bolt 92, static support 90 is moved in an upward and rearward direction for removal from either the front or back end thereof. Other keying or attachment configurations at both the front and rear of static support 90 are also possible.

Figure 10:
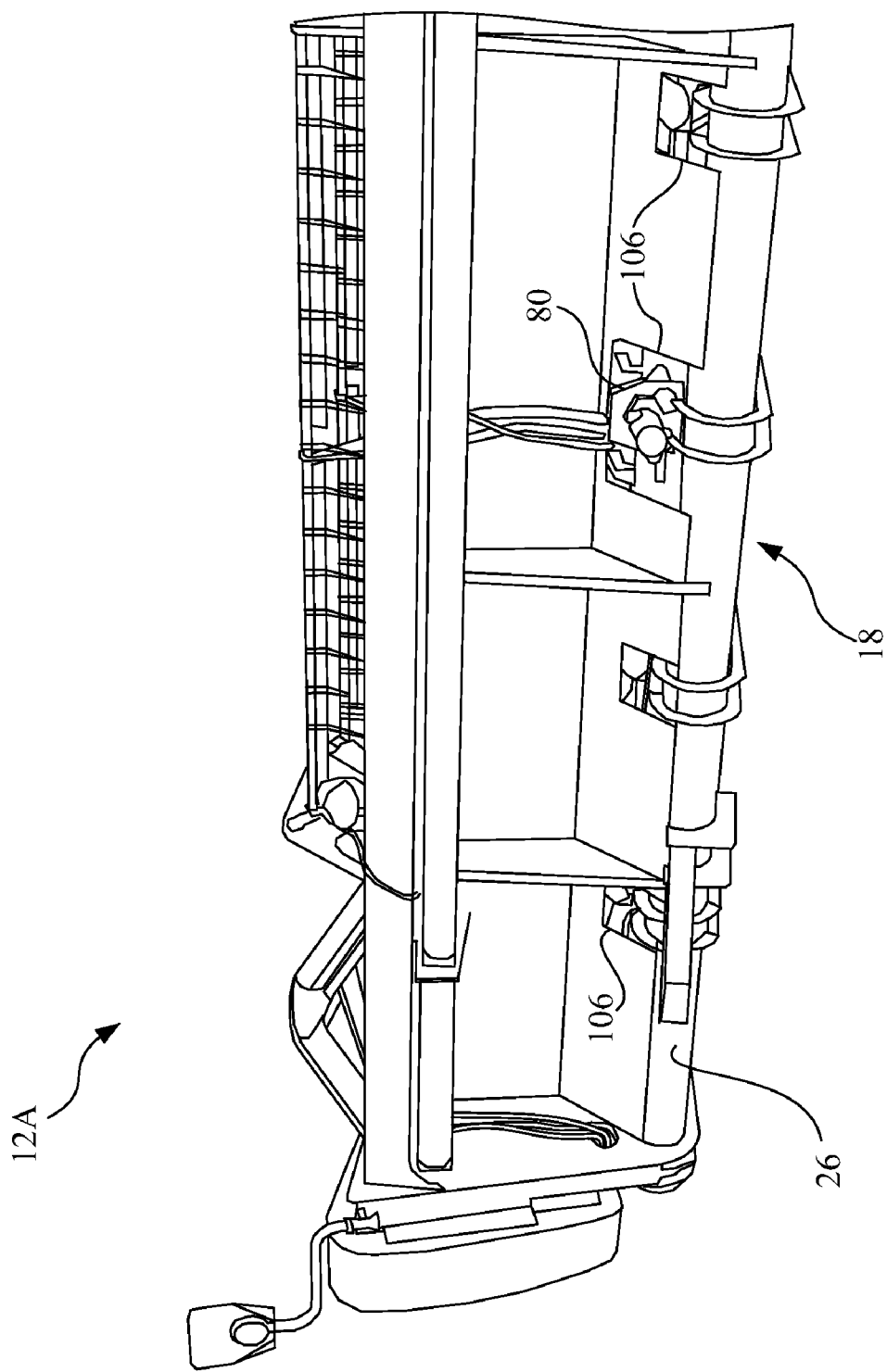
FIG. 10 is a fragmentary, rear view of the cutting platform shown in FIGS. 3 and 4.

In the embodiment shown in the drawings, each static support 90 includes a bent sheet metal piece 98 with a convex upper surface over which the top run of a belt 32 rides. The lower run of the belt rides in a space formed between bent piece 98 and the upper surface of float arm 28. A pair of end pieces 100 and 102 couple with opposite ends of bent piece 98. End piece 100 is welded or otherwise attached to the rear end of a float arm 28, and connects a rear end of bent piece 98 with the corresponding float arm 28 using bolt 92. End piece 102 is welded or otherwise attached to the front end of bent piece 98, and connects the front end of bent piece 98 with cutterbar assembly 22. To allow easy access to bolts 92, each frame 26 can include a plurality of access openings 106 in a rear wall thereof (FIG. 10).

Figure 7:
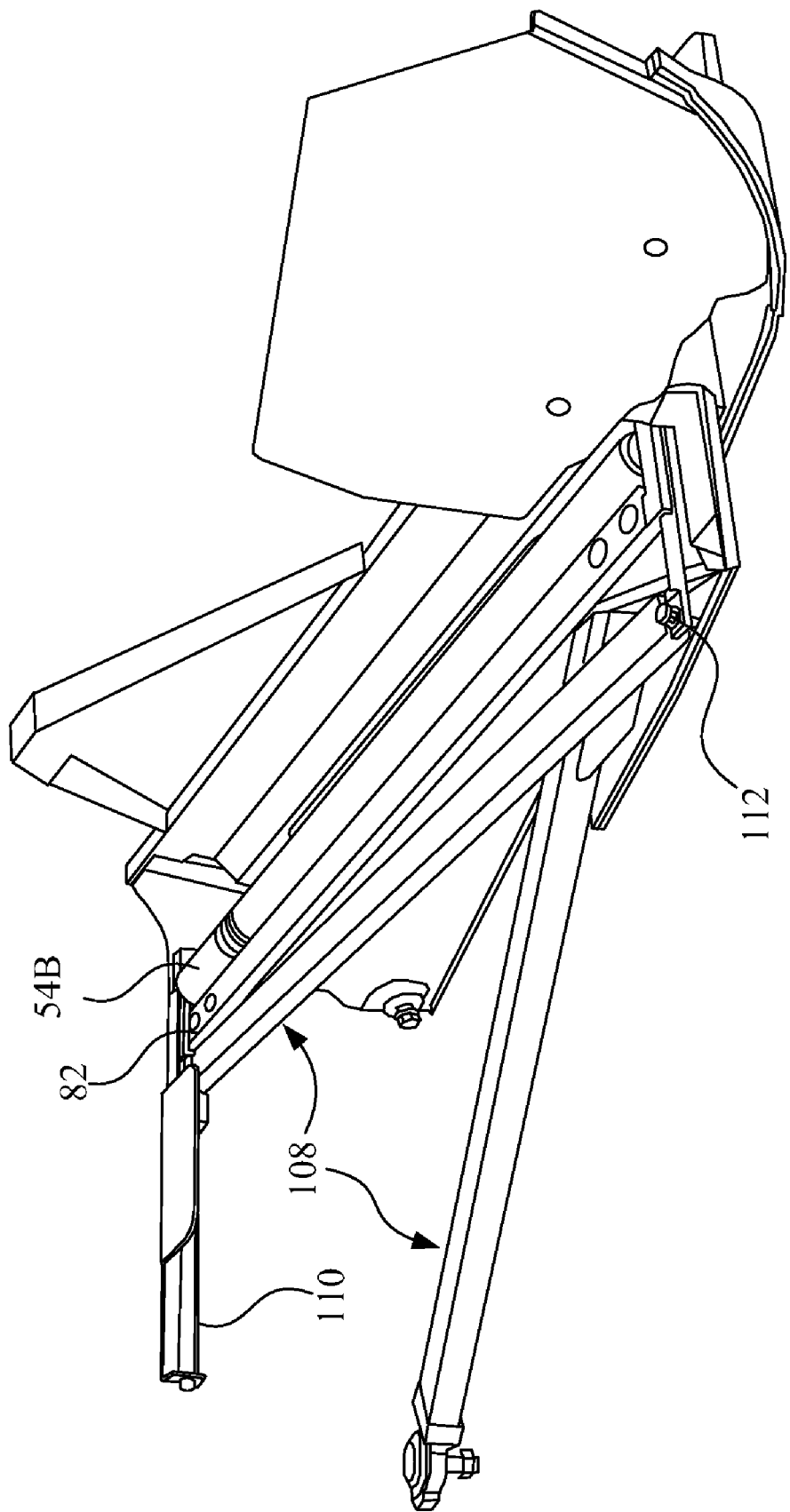
FIG. 7 is a perspective view of an outer idler roller assembly.
Figure 8:
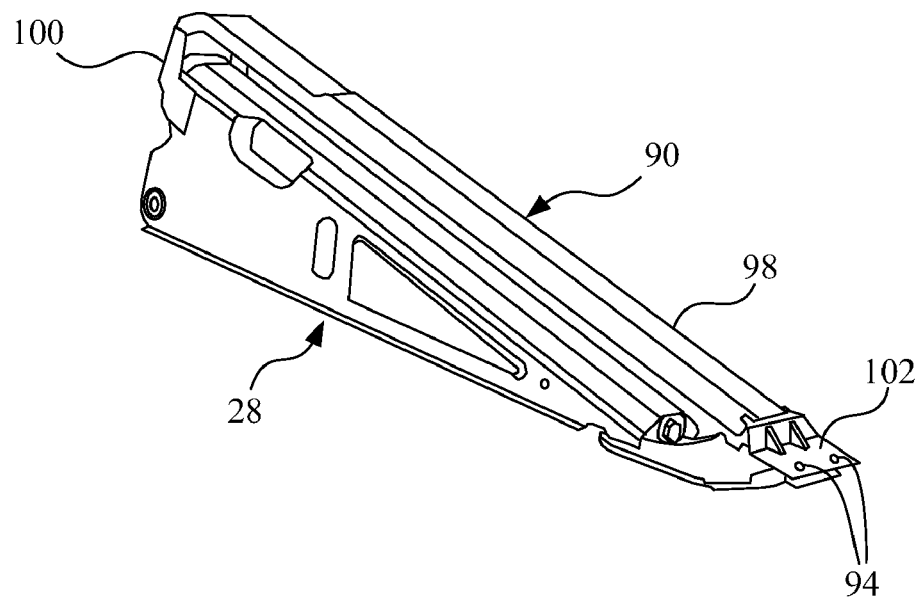
FIG. 8 is a perspective view of a static support.
Figure 9:
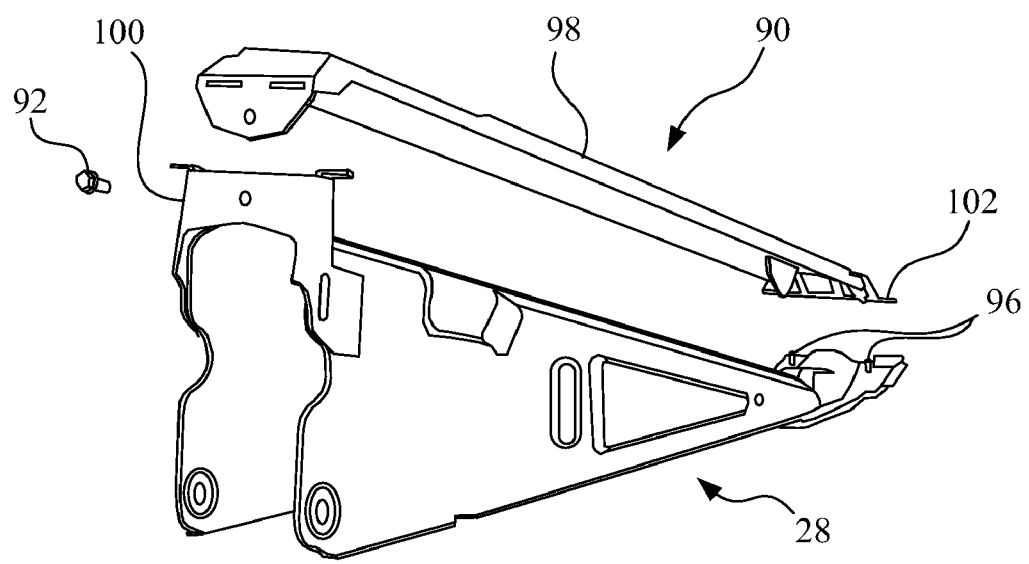
FIG. 9 is another perspective view of the static support shown in FIG. 8, when removed from a float arm.

Inner idler roller 54A and outer idler roller 54B each include a tensioner 108, which together define an inner idler roller assembly and an outer idler roller assembly. Tensioner 108 is made in a way so as to be quickly and easily loosened and detached to allow a belt 32 to be removed or installed (FIGS. 7, 11 and 12). Each tensioner 108 includes a threaded rod 110 which allows the tension force to be reduced or removed. Each tensioner 108 also includes a removable pin 112 which is removed after the tension force has been eased.

In the illustrated embodiment, rollers 54 are pivotable relative to float arms 28, and static supports 90 are removable relative to float arms 28. However, it may be possible for some or all of rollers 54 to be removable from a respective float arm 28 and thereby allow easy mounting of an endless belt 32. Likewise, it may be possible for some or all of static supports 90 to be pivotable from a respective float arm 28 and thereby allow easy mounting of an endless belt 32.

During use, it may from time to time be necessary to remove one or more endless belts 32 and mount new belts on the cutting platform. The crop ramps 76 and separate or integral brackets 88 are removed from the cutterbar assembly 22 in front of each roller 54A, 54B and 54C. The crop ramps 76 may or may not be removed in front of static supports 90, depending on the application. Drive rollers 54C are pivoted upwards and alignment plate 84 is removed (drive rollers 54C, sub-frames 82 and common drive 80 all pivot together). The tensioner 108 on each of inner idler roller 54A and outer idler roller 54B is loosened using threaded rod 110, and pin 112 is disconnected so that no tensioning force is applied to the belt. Idler rollers 54A and 54B are then pivoted upward. The static supports 90 are removed by removing bolts 92 accessible through access openings 106, disengaging the front end of the static supports, and sliding out from the inner loop of the belt. A new belt 32 is installed over the rollers 54, pivoted to a downward direction, and the static supports 90 are reinstalled. The tensioner 108 on each of the inner idler roller 54A and outer idler roller 54B are reattached and retightened. The crop ramps 76 and brackets 88 are reinstalled and the cutting platform is ready to use.

Having described the preferred embodiment, it will become apparent that various modifications can be made without departing from the scope of the invention as defined in the accompanying claims.

The invention claim is:

1. A cutting platform for use with an agricultural harvester, comprising:
    at least one platform section, each said platform section including:
        a frame;
        a cutterbar assembly defining a leading edge of said platform section, said cutterbar assembly being movable in a localized manner in upwards and downwards directions;
        an endless belt; and a plurality of float arms pivotally attached to said frame, at least one said float arm, carrying a roller supporting said endless belt and positioned within a loop of said endless belt, each said roller being one of pivotable and removable relative to said corresponding float arm, each said roller being one of a drive roller, an inner idler roller, and an outer idler roller.

2. The cutting platform of claim 1, wherein each said roller is pivotable at a rear end thereof such that a front end of said roller is positioned above said cutterbar assembly.

3. The cutting platform of claim 2, wherein each said roller is fastened to said cutterbar assembly at a front edge thereof.

4. The cutting platform of claim 1, including a first tensioner associated with said inner idler roller, and a second tensioner associated with said outer idler roller.

5. The cutting platform of claim 1, wherein one of said float arms carries a pair of drive rollers, one said drive roller carrying a first endless belt and an other said drive roller carrying a second endless belt.

6. The cutting platform of claim 5, wherein each of said drive rollers are driven by a common drive at a rear end thereof.

7. The cutting platform of claim 6, including an alignment plate interconnecting said pair of drive rollers at a front edge thereof.

8. The cutting platform of claim 7, wherein each said drive roller includes a flat projection, and said alignment plate includes a pair of slots for receiving said projections.

9. A cutting platform for use with an agricultural harvester, comprising:
at least one platform section, each said platform section including:
a frame;
a cutterbar assembly defining a leading edge of said platform section, said cutterbar assembly being movable in a localized manner in upwards and downwards directions;
an endless belt; and
a plurality of float arms pivotally attached to said frame, at least one said float arm carrying a roller supporting said endless belt and positioned within a loop of said endless belt, each said roller being one of pivotable and removable relative to said corresponding float arm, each said roller being supported by a sub-frame at a front end and a rear end thereof, each said roller and corresponding sub-frame pivoting at a rear end of said roller relative to said corresponding float arm such that a front end of said roller is positioned above said cutterbar assembly, each said sub-frame rotatably carrying a corresponding roller at said front end of said roller.

10. A cutting platform for use with an agricultural harvester, comprising:
at least one platform section, each said platform section including:
a frame;
a cutterbar assembly defining a leading edge of said platform section, said cutterbar assembly being movable in a localized manner in upwards and downwards directions;
an endless belt; and
plurality of float arms pivotally attached to said frame, at least one said float arm carrying a roller supporting said endless belt and positioned within a loop of said endless belt, each said roller being one of pivotable and removable relative to said corresponding float arm, wherein at least one said float arm carries a static support for supporting said endless belt, each said static support being positioned within a loop of said endless belt, said static support being one of pivotable and removable relative to said corresponding float arm.

11. The cutting platform of claim 10, wherein each said static support is removably fastened to said corresponding float arm at a rear edge thereof, and keyed to said cutterbar assembly at a front edge thereof.

12. The cutting platform of claim 11, wherein each said static support is a bent sheet metal piece with a convex upper surface.

13. The cutting platform of claim 12, including a pair of end pieces, one end piece connecting a rear end of said bent sheet metal piece with said float arm, and an other end piece connecting a front end of said bent sheet metal piece with said cutterbar assembly.

14. The cutting platform of claim 11, wherein said frame of each said cutting platform includes a plurality of access openings, each said access opening associated with a respective said roller or said static support.

15. The cutting platform of claim 11, further including a plurality of crop ramps extending over each of said rollers and said static supports adjacent said cutterbar assembly.

16. A cutting platform for use with an agricultural harvester, comprising:
at least one platform section, each said platform section including:
a frame;
a cutterbar assembly defining a leading edge of said platform section, said cutterbar assembly being movable in a localized manner in upwards and downwards directions;
an endless belt; and
a plurality of float arms pivotally attached to said frame, at least one said float arm carrying a roller supporting said endless belt and positioned within a loop of said endless belt, each said roller being one of pivotable and removable relative to said corresponding float arm, wherein said plurality of platform sections comprises three platform sections.

17. An agricultural harvester, comprising:
a feeder housing; and
a cutting platform attached to said feeder housing, said cutting platform including at least one platform section, each said platform section including:
a frame;
a cutterbar assembly defining a leading edge of said platform section, said cutterbar assembly being movable in a localized manner in upwards and downwards directions;
an endless belt; and
a plurality of float arms pivotally attached to said frame, at least one said float arm carrying a roller supporting said endless belt and positioned within a loop of said endless belt, each said roller being one of pivotable and removable relative to said corresponding float arm, each said roller being one of a drive roller, an inner idler roller, and an outer idler roller.

18. The agricultural harvester of claim 17, wherein each said roller is pivotable at a rear end thereof such that a front end of said roller is positioned above said cutterbar assembly.

19. The agricultural harvester of claim 18, wherein each said roller is fastened to said cutterbar assembly at a front edge thereof.

20. The agricultural harvester of claim 17, wherein one of said float arms carries a pair of drive rollers, one said drive roller carrying a first endless belt and an other said drive roller carrying a second endless belt.

21. The agricultural harvester of claim 18, wherein each of said drive rollers are driven by a common drive at a rear end thereof.

22. The agricultural harvester of claim 21, including an alignment plate interconnecting said pair of drive rollers at a front edge thereof.

23. The agricultural harvester of claim 22, wherein each said drive roller includes a flat projection, and said alignment plate includes a pair of slots for receiving said projections.

24. An agricultural harvester, comprising:
a feeder housing; and
a cutting platform attached to said feeder housing, said cutting platform including at least one platform section, each said platform section including:
a frame:
a cutterbar assembly defining a leading edge of said platform section, said cutterbar assembly being movable in a localized manner in upwards and downwards directions;
an endless belt; and
a plurality of float arms pivotally attached to said frame, at least one said float arm carrying a roller supporting said endless belt and positioned within a loop of said endless belt, each said roller being one of pivotable and removable relative to said corresponding float arm, each said roller being supported by a sub-frame at a front end and a rear end thereof, each said roller and corresponding sub-frame pivoting at a rear end of said roller relative to said corresponding float arm such that a front end of said roller is positioned above said cutterbar assembly, each said sub-frame rotatably carrying a corresponding roller at said front end of said roller.

25. An agricultural harvester, comprising:
a feeder housing; and
a cutting platform attached to said feeder housing, said cutting platform including at least one platform section, each said platform section including:
a frame;
a cutterbar assembly defining a leading edge of said platform section, said cutterbar assembly being movable in a localized manner in upwards and downwards directions;
an endless belt; and
a plurality of float arms pivotally attached to said frame, at least one said float arm carrying a roller supporting said endless belt and positioned within a loop of said endless belt, each said roller being one of pivotable and removable relative to said corresponding float arm, at least one said float arm carries a static support for supporting said endless belt, each said static support being positioned within a loop of said endless belt, said static support being one of pivotable and removable relative to said corresponding float arm.

26. The agricultural harvester of claim 25, wherein each said static support is removably fastened to said corresponding float arm at a rear edge thereof, and keyed to said cutterbar assembly at a front edge thereof.

27. The agricultural harvester of claim 26, wherein each said static support is a bent sheet metal piece with a convex upper surface.

28. The agricultural harvester of claim 27, including a pair of end pieces, one end piece connecting a rear end of said bent sheet metal piece with said float arm, and an other end piece connecting a front end of said bent sheet metal piece with said cutterbar assembly.

29. The agricultural harvester of claim 26, wherein said frame of each said cutting platform includes a plurality of access openings, each said access opening associated with a respective said roller or said static support.

30. The agricultural harvester of claim 26, further including a plurality of crop ramps extending over each of said rollers and said static supports adjacent said cutterbar assembly.

\* \* \* \* \*